(12) United States Patent
Zhang et al.

(10) Patent No.: US 11,155,344 B2
(45) Date of Patent: Oct. 26, 2021

(54) LOAD ASSEMBLY AND UNMANNED AERIAL VEHICLE

(71) Applicant: SZ DJI TECHNOLOGY CO., LTD., Shenzhen (CN)

(72) Inventors: Yongsheng Zhang, Shenzhen (CN); Jiadi Wang, Shenzhen (CN); Guibin Liang, Shenzhen (CN); Xingyuan Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 244 days.

(21) Appl. No.: 16/296,443

(22) Filed: Mar. 8, 2019

(65) Prior Publication Data
US 2019/0202549 A1 Jul. 4, 2019

Related U.S. Application Data

(63) Continuation of application No. PCT/CN2016/098630, filed on Sep. 9, 2016.

(51) Int. Cl.
*B64C 25/08* (2006.01)
*B64D 47/08* (2006.01)
(Continued)

(52) U.S. Cl.
CPC .............. *B64C 25/08* (2013.01); *B64B 1/00* (2013.01); *B64C 25/00* (2013.01); *B64C 25/12* (2013.01); *B64C 25/32* (2013.01); *B64C 25/52* (2013.01); *B64C 39/02* (2013.01); *B64C 39/024* (2013.01); *B64D 47/08* (2013.01); *H04N 5/2252* (2013.01);
(Continued)

(58) Field of Classification Search
CPC .......... B64C 2201/127; B64C 2201/20; B64C 25/08; B64C 25/10; B64C 25/12; B64C 25/52; B64C 39/024; H04N 5/247; H04N 5/2257; H04N 7/185; H04N 5/2258; H04N 5/2252; H04N 5/2253; H04N 7/181; B64B 1/00; B64D 47/08
See application file for complete search history.

(56) References Cited

U.S. PATENT DOCUMENTS 8,794,566 B2 * 8/2014 Hutson .................. F16M 13/02
244/17.23
9,004,396 B1 * 4/2015 Colin ..................... B64D 47/08
244/17.23

FOREIGN PATENT DOCUMENTS

CN 202961882 U 6/2013
CN 203439269 U 2/2014
(Continued)

OTHER PUBLICATIONS

Translation of CN-205499396-U (Year: 2016).*
Translation of CN-204086995-U (Year: 2015).*
World Intellectual Property Organization (WIPO) International Search Report for PCT/CN2016/098630 dated May 26, 2017 8 Pages.

*Primary Examiner* — Richard R. Green
*Assistant Examiner* — Steven J Shur
(74) *Attorney, Agent, or Firm* — Anova Law Group, PLLC

(57) ABSTRACT

An unmanned aerial vehicle (UAV) includes a UAV body including a first mounting member, a gimbal, and a plurality of stands. The gimbal includes a second mounting member connected to the first mounting member, and a gimbal body connected to the second mounting member. The plurality of stands are fixedly attached to the gimbal body and configured to rotate together with the gimbal body around a yaw axis of the gimbal body.

16 Claims, 4 Drawing Sheets

(51) Int. Cl.
*B64C 25/00* (2006.01)
*H04N 5/247* (2006.01)
*B64B 1/00* (2006.01)
*B64C 25/12* (2006.01)
*B64C 25/52* (2006.01)
*B64C 39/02* (2006.01)
*B64C 25/32* (2006.01)
*H04N 5/225* (2006.01)
*H04N 7/18* (2006.01)

(52) U.S. Cl.
CPC ......... *H04N 5/2253* (2013.01); *H04N 5/2257* (2013.01); *H04N 5/247* (2013.01); *H04N 7/185* (2013.01); *B64C 2025/325* (2013.01); *B64C 2201/027* (2013.01); *B64C 2201/127* (2013.01)

(56) References Cited

FOREIGN PATENT DOCUMENTS

| | | | |
|---|---|---|---|
| CN | 204086995 U | * | 1/2015 |
| CN | 204086995 U | | 1/2015 |
| CN | 104704279 A | | 6/2015 |
| CN | 105173100 A | | 12/2015 |
| CN | 105517903 A | | 4/2016 |
| CN | 105551280 A | | 5/2016 |
| CN | 205499396 U | * | 8/2016 |
| CN | 205499396 U | | 8/2016 |
| CN | 206694765 U | | 12/2017 |
| JP | H0943753 A | | 2/1997 |
| WO | 2015085598 A1 | | 6/2015 |

* cited by examiner

US 11,155,344 B2

LOAD ASSEMBLY AND UNMANNED AERIAL VEHICLE

CROSS-REFERENCE TO RELATED APPLICATION

This application is a continuation application of International Application No. PCT/CN2016/098630, filed on Sep. 9, 2016, the entire contents of which are incorporated herein by reference.

TECHNICAL FIELD

The present disclosure relates to the field of unmanned aerial vehicle and, more particularly, to a load assembly and an unmanned aerial vehicle with the load assembly mounted thereto.

BACKGROUND

In conventional technologies, an unmanned aerial vehicle (UAV) usually has a landing gear, which supports the UAV on the ground and protects the UAV from impact when the UAV lands.

An UAV landing gear is usually located below the UAV fuselage, is attached to the UAV fuselage, and uses a retractable structure. When the UAV is in a flight status, the landing gear can be retracted to clear space and view under the fuselage. Thus, the view of a camera mounted on a gimbal of the UAV is not blocked while the camera is rotating, and a large angle aerial photography operation may be achieved. The retractable landing gear needs a series of mechanisms, such as a link mechanism, a rack and pinion, a linear motor, and/or the like, and has a relatively complex structure and a relatively large weight. Further, extra power may need to be provided to achieve the retraction and extension of the landing gear, thereby impacting a performance of the UAV.

SUMMARY

In accordance with the disclosure, there is provided an unmanned aerial vehicle (UAV). The UAV includes a UAV body including a first mounting member, a gimbal, and a plurality of stands. The gimbal includes a second mounting member connected to the first mounting member, and a gimbal body connected to the second mounting member. The plurality of stands are fixedly attached to the gimbal body and configured to rotate together with the gimbal body around a yaw axis of the gimbal body.

Also in accordance with the disclosure, there is provided a load assembly including a gimbal and a plurality of stands. The gimbal includes a gimbal body and a mounting member connected to the gimbal body. The plurality of stands are attached to the gimbal body and configured to rotate together with the gimbal body around a yaw axis of the gimbal body.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
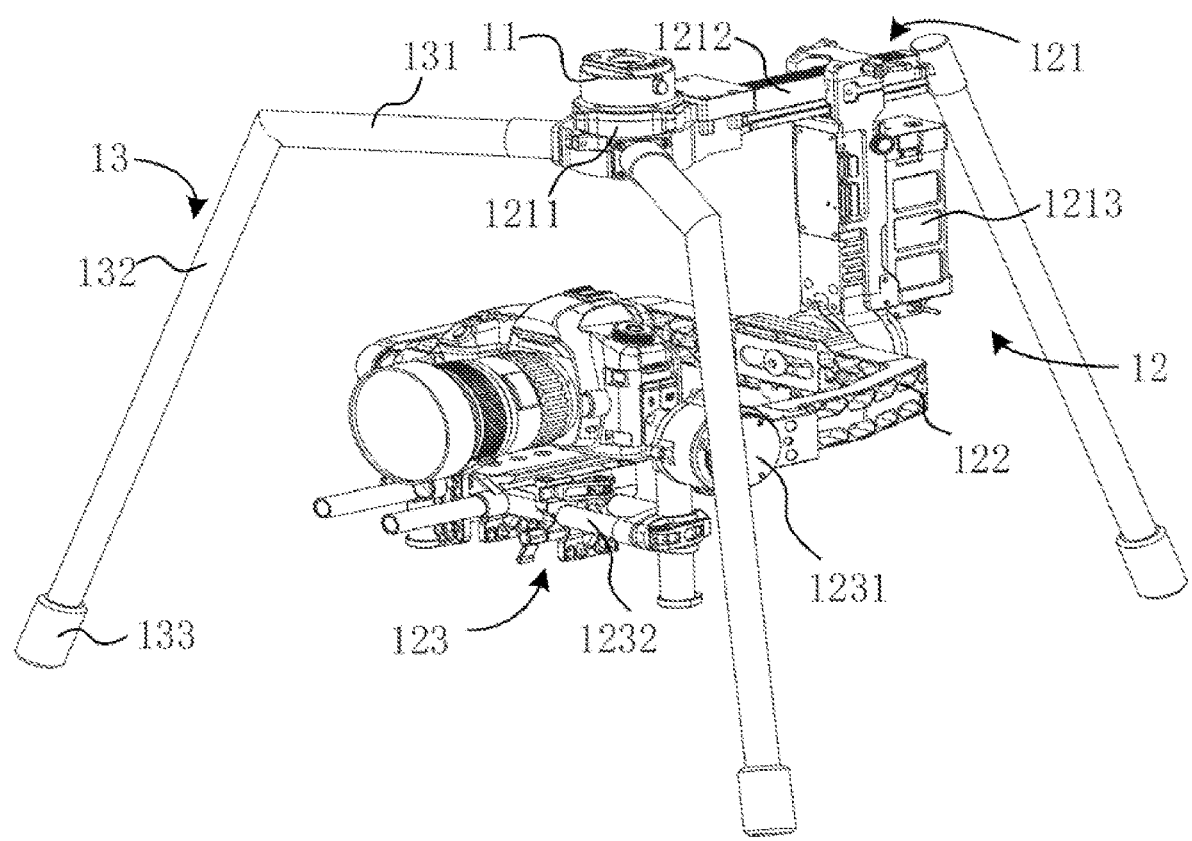
FIG. 1 illustrates a schematic structural diagram of an exemplary load assembly according to various disclosed embodiments of the present disclosure.

FIG. 1 illustrates a schematic structural diagram of an exemplary load assembly according to various disclosed embodiments of the present disclosure. As shown in FIG. 1, the load assembly includes a gimbal and a plurality of stands 13. The load assembly can be mounted to a carrying body (not shown in FIG. 1) through a connection between the gimbal and the carrying body. The carrying body can include a first mounting member. The gimbal includes a second mounting member 11 and a gimbal body 12. The second mounting member 11 can be matched with the carrying body for carrying the load assembly to realize the connection between the gimbal and the carrying body. The gimbal body 12 may be configured to securely mount, e.g., fix, a load thereto. The stands 13 may be attached to the gimbal body 12 and be outside an operation angle of the load. In the embodiments described below, an unmanned aerial vehicle (UAV) is described as an example of the carrying body. However, the carrying body consistent with the disclosure can be another type of carrying body, and is not limited to the UAV. In some embodiments, the load assembly can be mounted to the UAV.

In some embodiments, the gimbal may be located below a body of the UAV, also referred to as a "UAV body." Further, the second mounting member 11 of the gimbal may be attached to the gimbal body 12 by various means, including, but not limited to, using one or more snaps, using one or more threaded bolts, or using one or more pin joints.

After the installation of the gimbal, the gimbal can rotate with respect to the UAV body. For example, the gimbal may rotate with respect to the UAV body around Z axis of the UAV body.

The gimbal body 12 may be configured to fix, e.g., securely mount, a load. The stands 13, also referred to as "UAV stands," may be attached to the gimbal body 12, and may be located outside an operation angle of the load.

The load may include, for example, a camera, a cell phone, or another filming apparatus. Further, the load may include, for example, a detection apparatus that can emit infrared light, or a lighting apparatus such as an electric flashlight. During an operation of the load, a maximum operation angle for transmitting and receiving light or electricity may exist and may vary for different loads. In the present disclosure, positions of the UAV stands 13 are not restricted, and may be selected according to the load mounted on the gimbal body.

In some embodiments, the load may include an image-capturing apparatus, and the UAV stands 13 may be outside the maximum photographing angle of the image-capturing apparatus. Further, the UAV stands 13 may rotate together with the rotation of the image-capturing apparatus. Accordingly, the UAV stands 13 may not block a lens of the image-capturing apparatus during an operation of the image-capturing apparatus, and image capturing within an angle range of 360° without blocking may be achieved.

Referring to FIG. 1, the gimbal body 12 includes a yaw axis support 121, a roll axis support 122 rotatably coupled to the yaw axis support 121, and a pitch axis support 123 rotatably coupled to the roll axis support. Further, the load is attached to the pitch axis support 123, and the UAV stands 13 are attached to the yaw axis support 121.

The yaw axis support 121 includes a first vertical arm 1211, a first horizontal arm 1212, and a second vertical arm 1213. The second mounting member 11 is over an upper end of the first vertical arm 1211. A lower end of the first vertical arm 1211 is coupled to one end of the first horizontal arm 1212. The other end of the first horizontal arm 1212 is coupled to an upper end of the second vertical arm 1213, and a lower end of the second vertical arm 1213 is coupled to the roll axis support 122. Each of the UAV stands 13 may be directly fixed to the first vertical arm 1211, or indirectly fixed to the first vertical arm 1211, e.g., through the first horizontal arm 1212.

In some embodiments, the first vertical arm 1211 can rotate around the yaw axis of the UAV body under the control of the user or the UAV body, which can cause the UAV stands 13 fixed to the first vertical arm 1211 to rotate. The rotation of the first vertical arm 1211 can further drive the first horizontal arm 1212 coupled to the first vertical arm 1211, the second vertical arm 1213 coupled to the first horizontal arm 1212, the roll axis support 122 coupled to the second vertical arm 1213, the pitch axis support 123 coupled to the roll axis support 122, and the load mounted to the pitch axis support 123, such that the load can rotate together with the UAV stands 13. Because the load and the UAV stands 13 may both rotate as driven by the first vertical arm 1211, the load and the UAV stands 13 may have the same rotation angles, the same rotation directions, and the same rotation speeds as the first vertical arm 1211. Thus, the UAV stands 13 can remain outside the maximum operation angle of the load and may not disturb a normal operation of the load.

Similarly, the roll axis support 122 can rotate around an X axis under the control of the user or the UAV body, and can cause the load fixed on the pitch axis support 123 to rotate. The pitch axis support 123 can rotate around a Y axis under the control of the user or the UAV body to cause the load fixed on the pitch axis support 123 to rotate. Similarly, since the UAV stands 13 are outside the maximum operation angle of the load, the UAV stands 13 may not disturb the normal operation of the load when the load rotates.

In some embodiments, the first vertical arm 1211 shown in FIG. 1 may be relatively fixed to the first horizontal arm 1212 by using one or more threaded bolts, by welding, or by using another suitable method. In other embodiments, the first vertical arm 1211 may be coupled to the first horizontal arm 1212 and can slide along the first horizontal arm 1212.

In some embodiments, the second vertical arm 1213 may be coupled to the first horizontal arm 1212. Further, two rails may be formed at two opposite sides of the first horizontal arm 1212. A through hole may be formed at the upper end of the second vertical arm 1213. A guide matching with the rails at the sides of the first horizontal arm 1212 may be provided in the through hole, such that the second vertical arm 1213 can slide in an axial direction of the first horizontal arm 1212. In some other embodiments, the upper end of the second vertical arm 1213 may be provided with a component, such as a circular ring or the like, that matches a radial cross-section of the first horizontal arm 1212, such that the second vertical arm 1213 can be relatively coupled to the first horizontal arm 1212 and can slide along the axial direction of the first horizontal arm 1212. In some other embodiments, the second vertical arm 1213 may be fixed to the first horizontal arm 1212 by welding or the like.

In some embodiments, the second vertical arm 1213 may be provided with a battery case, in which a battery can be installed. The battery can be used to provide power for an operation of the gimbal. The second vertical arm 1213 may be provided with a charging port for charging the battery. In some other embodiments, the second vertical arm 1213 may not be provided with a battery case, and may not have a charging port.

In some embodiments, as shown in FIG. 1, the roll axis support 122 includes a U-shaped arm coupled to the second vertical arm 1213, and the pitch axis support 123 includes rotation shafts 1231 and a base 1232. Two ends of a U-shaped opening of the U-shaped are coupled to the two rotation shafts 1231 of the pitch axis support 123, respectively. The base 1232 is coupled to and arranged between the two rotation shafts 1231 for placing and fixing the load thereon and for arranging the load in the U-shaped opening of the U-shaped arm.

In some other embodiments, the yaw axis support 121 may not include the first horizontal arm 1212. In these embodiments, the second mounting member 11 may be over the upper end of the first vertical arm 1211, the lower end of the first vertical arm 1211 may be coupled to one end of the second vertical arm 1213, and the other end of the second vertical arm 1213 may be coupled to the roll axis support 122. In some embodiments, the load may be directly suspended from the lower end of the first vertical arm 1211.

In some embodiments, one end of the second vertical arm 1213 may be fixed to the lower end of the first vertical arm 1211 by welding. In some other embodiments, one end of the second vertical arm 1213 may be provided with a threaded hole, e.g., a tapped hole, at the inner side to match with a bolt provided at the lower end of the first vertical arm 1211, to achieve relative fixing. In some other embodiments, one end of the second vertical arm 1213 may be fixed to the lower end of the first vertical arm 1211 using another method, which is not restricted in the present disclosure.

As shown in FIG. 1, the number of the UAV stands 13 is three. Each of one or more UAV stands 13, such as the two front UAV stands 13 shown in FIG. 1, includes a first supporting arm 131 and a second supporting arm 132. One end of the first supporting arm 131 is fixed to the first vertical arm 121, and the other end of the first supporting arm 131 is relatively fixed to one end of the second supporting arm 132.

In some embodiments, the first supporting arm 131 may be fixed to the first vertical arm 1211 by welding. In some other embodiments, the first supporting arm 131 may include a threaded end, which can be rotated into a threaded hole at the outer side of the first vertical arm 1211. The first supporting arm 131 may be fixed to the first vertical arm 1211 by another suitable method, which is not restricted in the present disclosure. The other end of the first supporting arm 131 may be relatively fixed to one end of the second supporting arm 132 in a similar manner.

In some embodiments, as shown in FIG. 1, the UAV stand 13 behind the load includes a second supporting arm 132 directly fixed to one end of the first horizontal arm 1212 of the gimbal body 12. In some other embodiments, the UAV stand 13 behind the load may also have a structure including both a first supporting arm 131 and a second supporting arm 132, with one end of the first supporting arm 131 fixed to the first vertical arm 1211 and the other end of the first supporting arm 131 fixed to one end of the second supporting arm 132.

The first supporting arm 131 and the second supporting arm 132 may include carbon fiber tubes, or another material with light weight and high strength and rigidity, which are not restricted in the present disclosure.

Referring to FIG. 1, the UAV stand 13 further includes a cushion pad 133 at the other end of the second supporting arm 132. The cushion pad 133 may be configured to provide a cushion against an impact force between the UAV and a landing spot.

The cushion pad 133 may be made of a soft wear-resistant material, such as a rubber plug or a wear-resistant foam, and can be replaced periodically. The cushion pad 133 can cushion the impact force between the UAV and the landing spot and can protect the UAV.

In the above-described embodiments, the UAV stands may be fixed on the gimbal of the UAV, may be outside the operation angle of the load, and may rotate together with the load, such that the UAV stands may not block the operation of the load, and a 360° unblocked operation may be achieved. Further, the UAV stands may have a relatively simple structure, and may not need extra driving force for retraction. Further, the UAV stands may be made of a material with light weight, high strength, and high rigidity, thereby reducing a weight of the UAV.

Figure 2:
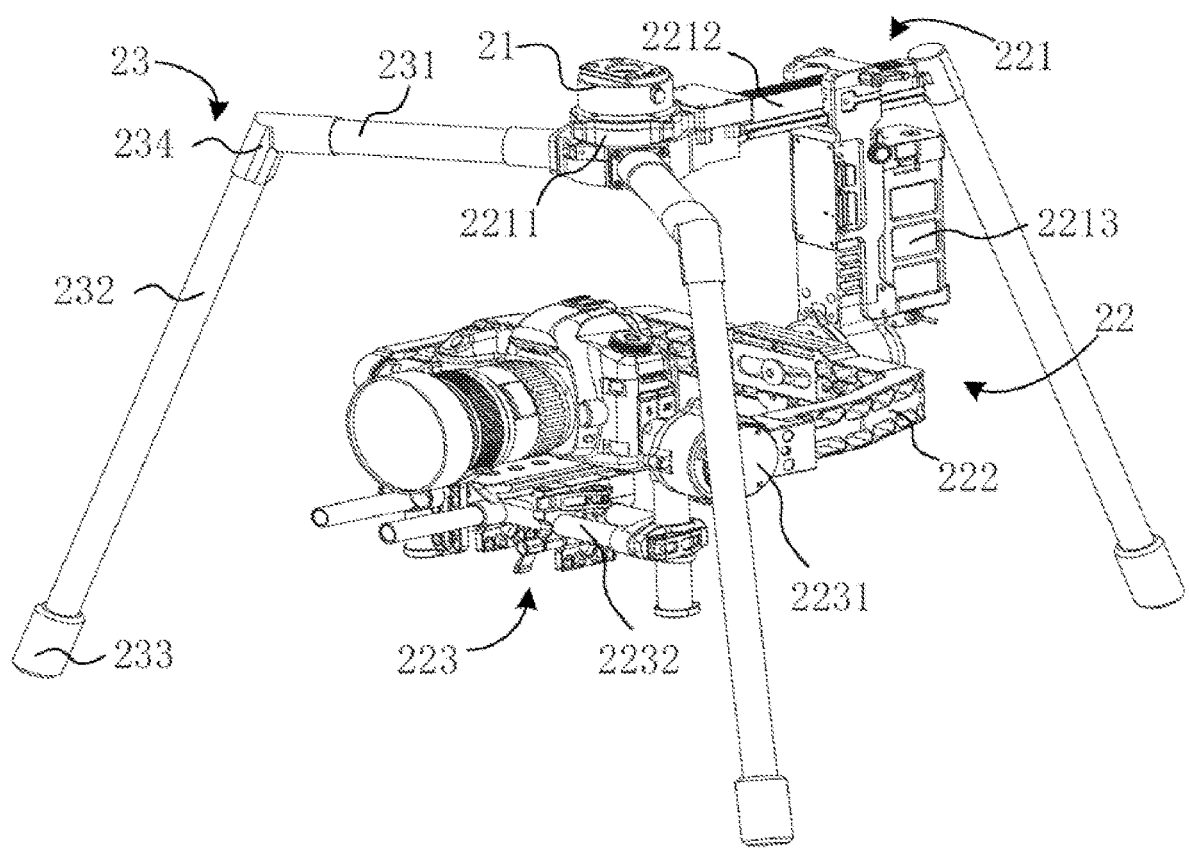
FIG. 2 illustrates a schematic structural diagram of another exemplary load assembly according to various disclosed embodiments of the present disclosure.

FIG. 2 illustrates a schematic structural diagram of another exemplary load assembly according to various disclosed embodiments of the present disclosure. Description of the portions of the structure in FIG. 2 that are similar to those of the structure in FIG. 1 is omitted. The load assembly in FIG. 2 differs from the load assembly in FIG. 1 in that, e.g., one or more UAV stands 23 in FIG. 2 further includes an adapter 234. A first supporting arm 231 and a second supporting arm 232 are coupled end-to-end through the adapter 234.

In some embodiments, the adapter 234 may be a bent part, and both ends of the bent part may be provided with socket holes. One end of the first supporting arm 231 and one end of the second supporting arm 232 may be detachably inserted in the socket holes at two ends of the bent part, respectively. That is, one end of the first supporting arm 231 and one end of the second supporting arm 232 may be inserted in the socket holes at two ends of the bent part and may be detached from the socket holes. The adapter 234 can be made of plastic or anther lightweight material, such that the UAV stands 23 can be conveniently dissembled, installed, and replaced.

In the above-described embodiments, the number of UAV stands is three. In some other embodiments, the number of UAV stands may be four or more.

Figure 3:
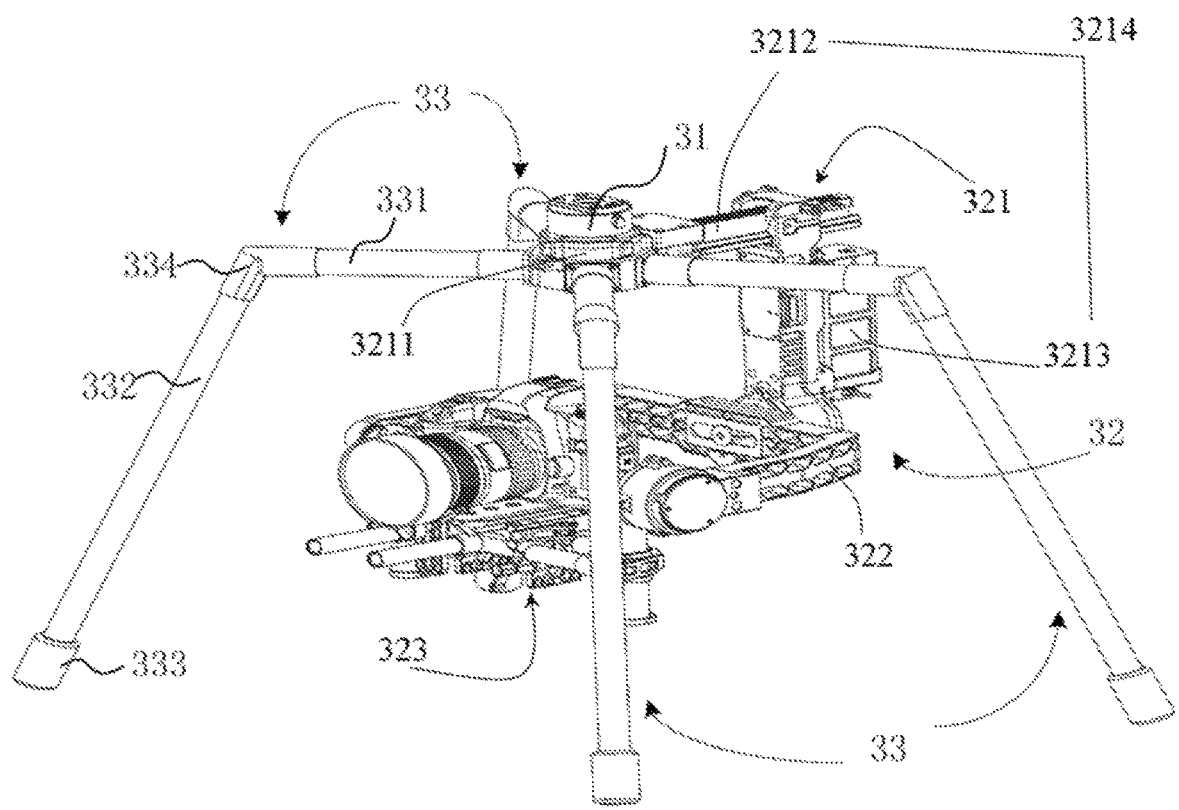
FIG. 3 illustrates a schematic structural diagram of another exemplary load assembly according to various disclosed embodiments of the present disclosure.

FIG. 3 illustrates a schematic structural diagram of another exemplary load assembly according to various disclosed embodiments of the present disclosure. Description of the portions of the structure in FIG. 3 that are similar to those of the structure in FIG. 2 is omitted. The load assembly in FIG. 3 differs from the load assembly in FIG. 2 in that, e.g., the number of UAV stands 33 in the load assembly in FIG. 3 is four. The UAV stands may be outside a front operation area of a load fixed on a gimbal body 32. That is, an angle between two UAV stands 33 in front of the load may be larger than an operation angle of the load. For example, if the load is a camera and the camera has a maximum shooting angle for taking photos, the angle between the two UAV stands 33 on two sides in front of the camera may be larger than the maximum shooting angle, such that the two UAV stands 33 may not block normal photo taking of the camera.

The yaw axis support 321 includes a first vertical arm 3211, a first horizontal arm 3212, and a second vertical arm 3213. The first horizontal arm 3212 and the second vertical arm 3213 form an adapter arm 3214. That is, the adapter arm 3214 includes the first horizontal arm 3212 and the second vertical arm 3213, and is coupled to the first vertical arm 3211. The roll axis support 322 is rotatably coupled to the adapter arm 3214. In some embodiments, a battery may be installed on the adapter arm 3214. As the load is mounted on the gimbal body 32, the adapter arm 3214 may be behind the load. Two of the four UAV stands 33 are on one side of the load, and the other two of the four UAV stands 33 are on the other side of the load. In some embodiments, the adapter arm 3214 may be on a symmetry axis of the two of the four UAV stands 33 and the other two of the four UAV stands 33.

The UAV stands 33 and the adapter arm 3214 may be separated from each other, i.e., not in direct contact with each other, thereby ensuring convenience in installation and replacement of the UAV stands 33. Further, a vibration received by the UAV stands upon touching a ground may not be directly transferred to the adapter arm. Therefore, stabilities of components carried by the adapter arm, such as a battery, may be ensured. As a result, an accidental power failure may be suppressed, and a stable operation of the UAV may be ensured.

In addition, the separation between the UAV stands 33 and the adapter arm may not block a sliding or a position adjusting of the second vertical arm 3213 along the first horizontal arm 3212. An interference between the UAV stands 33 and the adapter arm due to a movement of the adapter arm may be suppressed.

In addition, the UAV stands 33 may be distributed on both sides of the load, and the symmetrical structure may further ensure the stability and reduce the vibration received by the load. Further, support strength and stability of the plurality of UAV stands 33 may be improved.

In the embodiments described above in connection with FIG. 3, the number of UAV stands is four. In some other embodiments, the number of UAV stands may be five, six, seven, or more, and may be selected such that UAV stands in front of the load may not block the normal operation of the load. Further, the UAV stands may be separated from the adapter arm of the yaw axis support.

Figure 4:
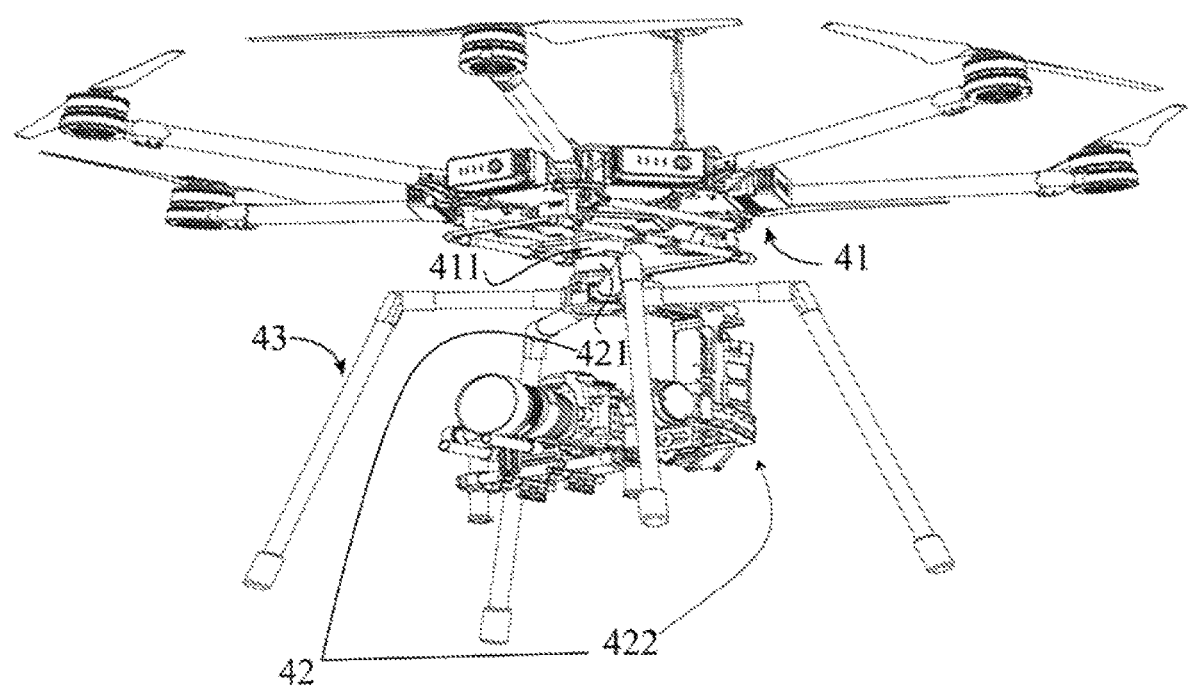
FIG. 4 illustrates a schematic structural diagram of an exemplary unmanned aerial vehicle according to various disclosed embodiments of the present disclosure.

FIG. 4 illustrates a schematic structural diagram of an exemplary UAV according to various disclosed embodiments of the present disclosure. As shown in FIG. 4, the UAV includes a UAV body 41, a gimbal 42, and UAV stands 43. A first mounting member 411 is provided at a bottom of the UAV body 41. The gimbal 42 includes a second mounting member 421 and a gimbal body 422. The second mounting member 421 of the gimbal 42 can match with the first mounting member 411 of the UAV body 41 to realize a coupling between the gimbal 42 and the UAV body 41. The gimbal body 422 is used for fixing a load thereto. The UAV stands 43 are fixed to the gimbal body 422 and are outside an operation angle of the load.

The UAV body 41 includes a multi-axis fuselage structure. That is, a plurality of axes are mounted on the fuselage of the UAV body 41, and each axis includes at least one propeller. A bottom of the UAV body 41 is provided with the first mounting member 411. The first mounting member 411 is coupled to the second mounting member 421 of the gimbal 42 to achieve the coupling between the gimbal 42 and the UAV body 41. After the gimbal 42 is installed to the UAV body 41, the gimbal 42 can rotate with respect to the UAV body 41. For example, the gimbal 42 may rotate with respect to the UAV body 41 around a Z axis of the UAV body 41.

The first mounting member 411 and the second mounting member 421 may be coupled to each other via a snap, or another suitable means, which is not restricted in the present disclosure.

The gimbal 42 and the UAV stands 43 in FIG. 4 are similar to the gimbal 32 and the UAV stands 33 in FIG. 3, descriptions of which are not repeated here. In other embodiments, the gimbal 42 and the UAV stands 43 may have other structures, such as the structures of the gimbal and the UAV stands in FIG. 1 or FIG. 2, descriptions of which are not repeated here.

The yaw axis support (shown but not labeled in FIG. 4) may include a first vertical arm and an adapter arm extending from the first vertical arm. A roll axis support is rotatably coupled to the adapter arm. In some embodiments, a battery may be mounted on the adapter arm. When the load is mounted on the gimbal body 422, the adapter arm may be behind the load. Two of the four UAV stands 43 may be on one side of the load, and the other two of the four UAV stands 43 may be on the other side of the load.

In some embodiments, the adapter arm may be located along a symmetry axis of the two of the four UAV stands 43 and the other two of the four UAV stands 43. An orientation of the load may be the same as or close to an orientation of a nose of the UAV, and the first vertical arm may be in an orientation of a tail of the UAV.

The UAV stands 43 and the adapter arm may be separated from each other, i.e., not in direct contact with each other, thereby ensuring conveniences of installation and replacement of the UAV stands 43. Further, when the UAV lands, a vibration received by the UAV stands 43 may not be transferred directly to the adapter arm. Therefore, stabilities of carried elements on the adapter arm, such as a battery, may be ensured. As a result, an accidental power failure may be suppressed, and a stable operation of the UAV may be ensured.

In addition, the separation between the UAV stands 43 and the adapter arm may not block a sliding or a position adjusting of the second vertical arm along the first horizontal arm. An interference between the UAV stand 43 and the adapter arm due to a movement of the adapter arm may be suppressed.

In addition, the UAV stands 43 may be distributed on both sides of the load, and the symmetrical structure may further ensure the stability and reduce the vibration received by the load. Further, support strength and stability of the plurality of UAV stands 43 may be improved.

In the UAV of the disclosure, UAV stands may be fixed to the gimbal body, may be outside a maximum operation angle of a load fixed to the gimbal body, and can rotate following the rotation of the load. Thus, during an operation of the load, the UAV stands may not block the load, and a 360° unblocked operation may be achieved. Further, the UAV stand may have a relatively simple structure, and may not need extra driving force for retraction. Further, the UAV stand may be made of a material with light weight, high strength, and high rigidity, thereby reducing a weight of the UAV.

The present disclosure provides a load assembly and a UAV for mounting the load assembly. The load assembly may include a gimbal and a plurality of stands. The gimbal may include a second mounting member and a gimbal body. The second mounting member may be configured to match a mount body to which the load assembly is mounted, such that a coupling between the gimbal and the mount body may be achieved. The gimbal body may be used to fix a load thereto, and the plurality of UAV stands may be attached to the load assembly, and may be outside an operation angle of the load. In the present disclosure, during an operation of the load, the UAV stands may not block the load, and a 360° unblocked operation may be achieved. Further, the UAV stand may have a relatively simple structure, may not need extra driving force for retraction, and a weight of the UAV may be reduced.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:
1. An unmanned aerial vehicle (UAV), comprising:
a UAV body including a first mounting member;
a gimbal including:
   a second mounting member connected to the first mounting member; and
   a gimbal body connected to the second mounting member and including:
      a yaw axis support including:
         a first vertical arm, one end of the first vertical arm being coupled to the second mounting member;
         a horizontal arm, one end of the horizontal arm being coupled to the first vertical arm; and
         a second vertical arm, one end of the second vertical arm being coupled to the horizontal arm; and
a plurality of stands fixedly attached to the gimbal body and configured to rotate together with the gimbal body around a yaw axis of the gimbal body, one of the plurality of stands being directly fixed to the first vertical arm, and another one of the plurality of stands being indirectly fixed to the first vertical arm through the horizontal arm.

2. The UAV according to claim 1, wherein the gimbal body further includes:
   a roll axis support rotatably coupled to the yaw axis support; and
   a pitch axis support rotatably coupled to the roll axis support and configured to carry a load.

3. The UAV according to claim 1, wherein:
   a number of the plurality of stands is at least three, and
   each of one or more of the plurality of stands includes:
      a first supporting arm having one end fixed to the yaw axis support, and
      a second supporting arm having one end coupled to another end of the first supporting arm.

4. The UAV according to claim 3, wherein:
   the number of the plurality of stands is four.

5. The UAV according to claim 3, wherein:
   each of the one or more of the plurality of stands includes a cushion pad at another end of the second supporting arm.

6. The UAV according to claim 3, wherein:
   each of the one or more of the plurality of stands includes an adapter, and
   the first supporting arm and the second supporting arm are coupled end-to-end through the adapter.

7. The UAV according to claim 6, wherein:
   the adapter includes a bent part including two socket holes at two ends of the bent part, respectively,
   one end of the first supporting arm is detachably inserted in one of the two socket holes, and
   one end of the second supporting arm is detachably inserted in another one of the two socket holes.

8. The UAV according to claim 1, wherein:
   the gimbal body is configured to carry an image-capturing apparatus, and
   the stands are outside a maximum photographing angle of the image-capturing apparatus and configured to rotate together with the image-capturing apparatus.

9. A load assembly, comprising:
   a gimbal including:
      a gimbal body including:
         a yaw axis support including:
            a first vertical arm, one end of the first vertical arm being coupled to the second mounting member;
            a horizontal arm, one end of the horizontal arm being coupled to the first vertical arm; and
            a second vertical arm, one end of the second vertical arm being coupled to the horizontal arm; and
      a mounting member connected to the gimbal body; and
      a plurality of stands attached to the gimbal body and configured to rotate together with the gimbal body around a yaw axis of the gimbal body, one of the plurality of stands being directly fixed to the first vertical arm, and another one of the plurality of stands being indirectly fixed to the first vertical arm through the horizontal arm.

10. The load assembly according to claim 9, wherein the gimbal body further includes:
   a roll axis support rotatably coupled to the yaw axis support; and
   a pitch axis support rotatably coupled to the roll axis support.

11. The load assembly according to claim 9, wherein:
   a number of the plurality of stands is at least three, and
   each of one or more of the plurality of stands includes:
      a first supporting arm having one end fixed to the yaw axis support, and
      a second supporting arm having one end coupled to another end of the [[fist]] first supporting arm.

12. The load assembly according to claim 11, wherein:
   the number of the plurality of stands is four.

13. The load assembly according to claim 11, wherein:
   each of the one or more of the plurality of stands includes a cushion pad at another end of the second supporting arm.

14. The load assembly according to claim 11, wherein:
   each of the one or more of the plurality of stands includes an adapter, and
   the first supporting arm and the second supporting arm are coupled end-to-end through the adapter.

15. The load assembly according to claim 14, wherein:
   the adapter includes a bent part including two socket holes at two ends of the bent part, respectively,
   one end of the first supporting arm is detachably inserted in one of the two socket holes, and
   one end of the second supporting arm is detachably inserted in another one of the two socket holes.

16. The load assembly according to claim 9, wherein:
   the gimbal body is configured to carry an image-capturing apparatus, and
   the stands are outside a maximum photographing angle of the image-capturing apparatus and configured to rotate together with the image-capturing apparatus.

* * * * *